United States Patent [19]
Tomczak et al.

[11] Patent Number: 5,780,384
[45] Date of Patent: Jul. 14, 1998

[54] HYDRATED MANGANESE DIOXIDE OXIDATION CATALYSTS AND PROCESS OF PRODUCING SAME

[75] Inventors: Douglas Charles Tomczak, Bethesda, Md.; Cristian Libanati, Washington, D.C.; Jean Willem Beeckman, Columbia, Md.

[73] Assignee: Megtec Systems, Inc., De Pere, Wis.

[21] Appl. No.: 778,935

[22] Filed: Jan. 3, 1997

[51] Int. Cl.$^6$ .............. B01J 23/00; B01J 23/32; B01J 8/00; B01J 8/02
[52] U.S. Cl. .............. 502/324; 502/303; 502/304; 502/324; 502/11; 423/245.1; 423/213.5
[58] Field of Search .............. 502/303, 304, 502/324, 11; 423/245.1, 213.5

[56] References Cited

U.S. PATENT DOCUMENTS

| | | | |
|---|---|---|---|
| 3,700,605 | 10/1972 | Dodman et al. | 502/324 |
| 3,894,967 | 7/1975 | Koepernik et al. | 502/324 |
| 3,931,390 | 1/1976 | Palilla et al. | 423/244 |
| 3,993,572 | 11/1976 | Hindin et al. | 252/462 |
| 4,299,735 | 11/1981 | Mein et al. | 252/465 |
| 5,141,912 | 8/1992 | Ernest et al. | 502/320 |
| 5,164,351 | 11/1992 | Steinbach et al. | 502/74 |

*Primary Examiner*—Glenn Caldarola
*Assistant Examiner*—Tanaga A. Boozer
*Attorney, Agent, or Firm*—Mitchell D. Bittman; Beverly J. Artale

[57] ABSTRACT

The present invention generally relates to supported mono charged cation delta manganese dioxide hydrate having a noble metal on the surface thereof, and to the use thereof for low temperature oxidation of volatile organic compounds (VOCs), particularly oxygen-containing VOCs. The present invention further relates to the use of the supported catalysts to reduce the amount of VOCs present in waste gases produced by processes such as baking, brewing, and flexographic printing. Catalysts prepared from the supported manganese-containing catalysts have increased resistance to poisoning in the presence of catalyst contaminants, e.g., sulfur containing compounds.

30 Claims, 3 Drawing Sheets

Accelerated Aging Studies

Accelerated Aging Studies

Accelerated Aging Studies 5,780,384

1

HYDRATED MANGANESE DIOXIDE OXIDATION CATALYSTS AND PROCESS OF PRODUCING SAME

FIELD OF THE INVENTION

The present invention generally relates to supported delta manganese oxidation catalysts and the use thereof for low temperature oxidation of volatile organic compounds (VOCs). More particularly, the present invention relates to oxidation catalysts which comprise a mono charged cation delta manganese dioxide hydrate and a noble metal supported on an inert carrier, and to the process for producing said catalysts. The invention also relates to the use of these novel catalysts to reduce the amount of VOCs, in particular oxygenated VOCs, in waste gases, in the presence of catalyst poisons such as sulfur.

BACKGROUND OF THE INVENTION

It is known that waste gases, such as automobile exhaust gases and exhaust gases from a variety of industrial and commercial equipment and processes, contain organic compounds which should be removed or otherwise converted to less noxious compounds before emission into the atmosphere.

A great number of these industrial and commercial processes involve the release of oxygenated VOCs into the atmosphere. For example, ethanol and other alcohols may be released as components of waste gases produced during baking and fermentation. Flexoprinting processes may also involve the release of VOCs into the atmosphere. Emissions in flexographic printing processes arise from organic solvents that may be present in the ink and from solvent that may be used for press cleaning. Solvents commonly used in flexographic printing include ethanol, isopropanol, N-propanol, hexane, toluene, isopropyl acetate, N-propyl acetate, glycols and glycol ethers.

Recently enacted governmental regulations concerning the amount of oxygenated VOCs which may be released into the atmosphere have led to more stringent demands on industry to reduce such VOC emissions. One technique for removing or minimizing VOCs in waste gas streams is a low temperature catalytic incineration process which relies on an oxidation catalyst to combust the VOCs in the presence of oxygen.

Various manganese containing catalysts have heretofore been used to catalyze the reduction of VOCs in waste gas. For example, Ernest et al in U.S. Pat. No. 5,141,912 describe a manganese containing catalyst, useful for the control of hydrocarbon emissions. The catalyst may comprise manganese oxide and a platinum group catalyst impregnated on a porous refractory oxide support.

In U.S. Pat. No. 3,894,967, Koerpernik et al disclose a manganese containing catalyst for removal of VOCs from automobile exhaust gases. Such catalysts consist essentially of aluminum oxide on which is supported from about 1% to about 5% oxide of manganese, and from about 0.01% to about 0.5% of a noble metal. It would appear from the specific preparation procedures which includes relatively high calcination temperatures, and from the working examples, that the manganese in the Koerpernik et al catalyst is in the form of $Mn_2O_3$ and is free from hydration.

The Mein et al patent, U.S. Pat. No. 4,299,735, discloses a catalyst which is useful for applications such as the oxidation of exhaust gases from paint drying ovens. The catalyst is a heavy metal-manganese oxide catalyst that is prepared from an alkali metal delta manganese dioxide hydrate starting material. The starting material is obtained as a by-product in the industrial oxidation of organic substances by potassium permanganate.

An oxidation catalyst specifically containing an alkali metal delta manganese dioxide hydrate has been described in U.S. Pat. No. 3,700,605 to Dodman et al. The Dodman et al patent describes a procedure for preparing an alkali metal delta manganese dioxide hydrate catalyst which may be used in reduction reactions, such as reduction of nitrocompounds with carbon monoxide. The catalyst is prepared by first forming a manganese oxide precipitate from potassium permanganate in the presence of an alkali metal hydroxide. The precipitate is recovered and is resuspended in water, and an aqueous solution of a salt of a polyvalent metal, such as cobalt, copper, silver or lead, is then added to the suspension to react with the precipitate and to replace at least some of the alkali metal ions with the polyvalent metal ions. The Dodman et al patent proposes the addition of an inert insoluble substance, such as kieselguhr or silica, to the potassium permanganate solution as it is being converted to manganese oxide so as to provide a catalyst support. There is no suggestion in this patent of adding a noble metal to the catalyst or using the catalyst in the presence of a poison, e.g. sulfur.

Despite heretofore known manganese oxide containing catalysts, the search for catalytic compositions which are durable and maintain their ability to catalytically oxidize VOCs, in particular oxygenated VOCs, continues. Catalytic poisoning is probably the major cause of a shortened life span of such catalysts. Poisons tend to chemically bind to the active sites of an oxidation catalyst thereby destroying its catalytic activity.

Typical contaminants or poisons known to accelerate catalyst deactivation include, but are not limited to, compounds containing sulfur, halogens, silicon and/or phosphorous. Water and carbon dioxide may also be included as catalyst poisons or contaminants.

Of these contaminants, sulfur is probably the most ubiquitous. Sulfur containing compounds originate from several sources, i.e. fermentation processes or some printing inks solvents. However, the most common source of sulfur comes from combustion of natural gas or fuel oils. Although the amounts of sulfur in a waste gas stream is usually in the ppb range, its cumulative effect over time can be sufficient to reduce the lifetime of a catalyst.

Thus, there exists a need in various industries for catalysts and methods which can efficiently reduce the level of VOCs, in particular oxygen containing VOCs, in waste gases at low temperature. There is also a need for oxidation catalysts useful for the destruction of VOCs which offer increased resistance to poisoning in the presence of catalyst contaminants, in particular sulfur.

SUMMARY OF THE INVENTION

Accordingly, the present invention provides a novel oxidation catalyst which can reduce the amount of VOCs in a waste gas stream. In particular, the catalyst of the invention is useful for reducing the amount of oxygen-containing VOCs in a waste gas stream by oxidizing the compounds to carbon dioxide and water at low temperatures.

The present invention also provides a catalyst for reducing the amount of VOCs, in particular oxygen-containing VOCs, which catalyst offers increased resistance to poisoning by contaminants such as sulfur compounds. The catalyst of the invention also offers significant economic advantages by extending the life of the catalyst in VOC oxidizers in the presence of catalyst contaminants over that of conventional oxidation catalyst.

The present invention also provides a method for preparing catalysts for use to reduce VOCs, in particular oxygenated VOCs, in waste gas streams.

Also provided by the present invention is a method for reducing VOCs, in particular oxygen-containing VOCs, in waste gas at low temperatures.

Additional features and advantages of the invention will be set forth in the description which follows, and in part will be apparent from the description or may be learned from practice of the invention. The advantages of the invention will be realized and attained by the compositions and methods particularly pointed out in the written description and claims.

To achieve these and other advantages and in accordance with the purpose of the invention, as embodied and broadly described, the catalyst of the invention comprises a mono charged cation delta manganese dioxide hydrate supported on an inert support. Additionally, the supported catalyst contains a noble metal. To reduce VOCs in waste gases, the supported delta manganese oxide catalyst is contacted with a waste gas stream at a temperature sufficient to oxidize the VOCs to carbon dioxide.

It is to be understood that both the foregoing general description and the following detailed description are exemplary and explanatory and are intended to provide further explanation of the invention as claimed.

DETAILED DESCRIPTION OF THE INVENTION

Figure 1:
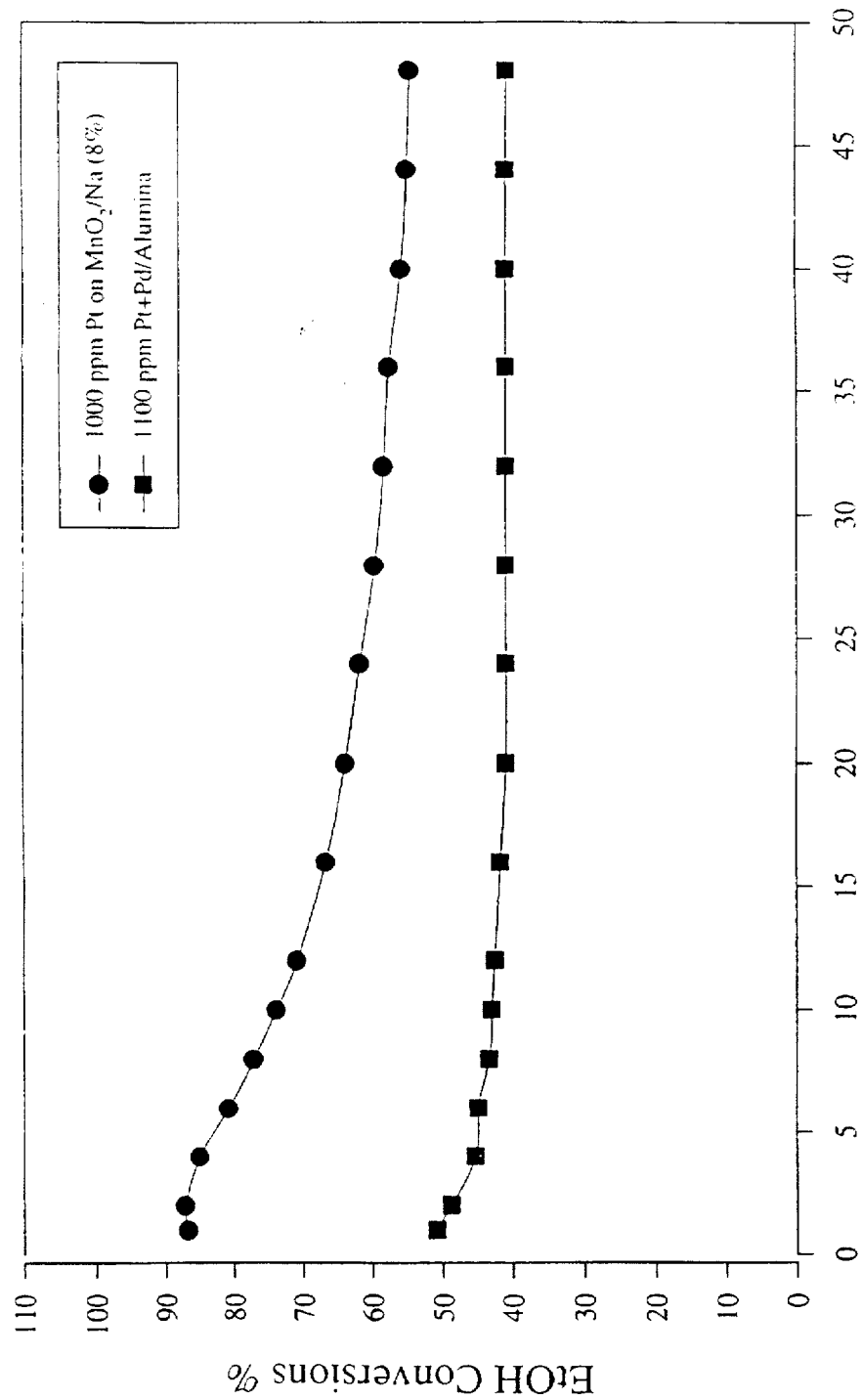
FIG. 1 compares the conversion of ethanol in the presence of $SO_2$ versus hours of aging for $Pt/(Na)MnO_2.H_2O$ supported on $Al_2O_3$ and a commercial catalyst containing Pt/Pd on $Al_2O_3$.

The present invention is directed to a supported delta manganese catalyst having a noble metal on the surface thereof. As used herein, the term "delta manganese" is intended to mean a mono charged cation delta manganese dioxide hydrate having the general formula

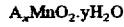

$$A_xMnO_2.yH_2O$$

where x is 0.1 to 2, y is 0.1 to 5, A is alkali metal or $NR_4^+$ and R is H or an alkyl group having 1 to 6 carbon atoms.

The inert support may be any material which is substantially inert relative to the various catalyst components and oxidation reactions for which the catalysts are to be used. Typical support materials include but are not limited to, metal, glass or porous inorganic materials. Preferably, the inert support is a porous metal oxide. The surface area of suitable porous metal oxides is generally in the range of 25 to 500 $m^2/g$. Illustrative examples of suitable porous metal oxides include aluminum oxides ($Al_2O_3$), silica ($SiO_2$), magnesium aluminate ($MgAl_2O_4$), titanium oxides ($TiO_2$), zirconium oxides ($ZrO_2$) or mixtures of two or more of these oxides. More preferably, the porous metal oxide support is alumina, most preferably gamma alumina.

The form of the support material is not critical to the practice of the invention. Generally the inert support may be in any form suitable for the intended application of the inventive catalyst. Illustrative examples of suitable forms include beads, powders (such as spray-dried powders), fibers, sheets, slurries, gels, monoliths, honeycombs, washcoats and extrudates. Preferably, the inert support is in the form of beads or extrudates. Most preferably, the support is porous alumina beads, between 2 mm and 8 mm in diameter, with a BET surface area of 20 to 400 $m^2/g$ and a pore volume of greater than 0.8 cc/g.

The catalysts of this invention are prepared by depositing onto an inert support about 2 to about 10% by weight of manganese, and a catalytically effective amount of one or more noble metals. The inert support is optionally heat-treated prior to deposition of catalyst to ensure dryness. Those skilled in the art will be familiar with such heating conditions and will be readily able to determine suitable heating conditions depending upon the support used. For example, metal oxide supports are preferably heated from about 300° C. to about 700° C.

The catalyst of the invention may be prepared using any conventional method. In one method of this invention, the invention catalysts are prepared by first impregnating an inert support with an aqueous solution of a suitable manganese salt and optionally drying the support at a temperature from about room temperature to about 200° C. for about 1 to 48 hours, preferably about 40° C. to about 150° C. from about 4 to 16 hours. The dried manganese containing support is then impregnated in a second impregnation step with aqueous solution of a mono charged cation containing hydroxide compound and the support is allowed to dry in an oxygen containing atmosphere for a time and at a temperature sufficient to form a delta manganese on or in the surface of the support. Optionally, the delta manganese impregnated support is thereafter dried at about 100° C. to about 300° C. for up to 16 hours. Next, one or more noble metals are impregnated onto the delta manganese support using an aqueous solution of salts of noble metals. After impregnation, the support is dried and/or calcined at a temperature of about 200° C. to about 450° C. to produce the final catalyst.

In another embodiment of the invention, the invention catalysts are prepared by first impregnating an inert support with an aqueous solution of a suitable manganese salt and optionally, drying the impregnated support at a temperature from about 20° C. to about 200° C. for about 1 to 48 hours, preferably about 40° C. to 150° C. from about 4 to about 16 hours. The dried manganese containing support is then impregnated with an aqueous solution containing a mono charged cation containing hydroxide compound and a noble metal salt. The support is allowed to dry in an oxygen containing atmosphere for a time and temperature sufficient to form the delta manganese phase on the support. The final catalyst is obtained by drying and/or calcining the impregnated delta manganese for a time and at a temperature sufficient to decompose the noble metal salt to an active noble metal species, i.e., at about 200° C. to 450° C. for about 2 hours.

In a third method in accordance with the invention, the invention catalysts support are prepared by impregnating an inert support with an aqueous solution of a suitable manganese salt. Thereafter, the support is impregnated with an aqueous solution of a mono charged cation containing hydroxide compound and at least one noble metal salt. The impregnated support is then dried in an oxygen containing atmosphere for a time and temperature sufficient to permit formation of a delta manganese in or on the surface of the support, i.e., room temperature to about 80° C. for up to 2 hours. The final catalyst is obtained by drying and/or calcining the impregnated support as mentioned hereinabove.

Suitable manganese salts useful to prepare the invention catalyst include any water soluble manganese salt, e.g., manganese nitrate, manganese acetate and the like. Concentrations of manganese salts useful will vary. In general, any aqueous manganese solution having a sufficient combination of manganese ions to provide a final loading of a delta manganese having an amount of $MnO_2 \cdot H_2O$ component in the range of 0.5 to 40 wt %, preferably about 2 to about 10 wt %, of the total loading on the catalyst support.

Mono charged cation containing hydroxide compounds useful in the invention include, for example, sodium hydroxide, potassium hydroxide, lithium hydroxide, rubidium hydroxide, cesium hydroxide and $NR_4^+OH$, where R is H or an alkyl group having from 1 to 6 carbon atoms. Concentrations of the aqueous hydroxide solutions are preferably in excess of concentrations used for manganese salt solution. Preferably, the hydroxide solutions contain a concentration of mono charged cation containing hydroxide compounds such that the atomic ratio of mono charged cation to manganese in the delta manganese phase is in the range of 0.1 to 3. As will be understood by one skilled in the arts, concentration and impregnation levels of the hydroxides will vary to achieve the desired ratio.

Suitable noble metals useful in the present invention include, but are not limited to, platinum, palladium, silver, gold, rhodium, iridium, ruthenium and osmium. Any conventional noble metal-containing compound which can be decomposed to the leave a noble metal upon heating is useful in the present invention to provide the noble metal component. Suitable among such compounds include, for example, hexachloroplatinic acid, palladium tetrammine chloride, platinum tetrammine chloride, platinum tetrammine hydroxide, palladium tetrammine hydroxide, palladium chloride, $Pt(OH_2)_4Cl_2$ and the like. Mixtures of more than one noble metal compound, such as mixtures of palladium tetrammine chloride and platinum tetrammine chloride, also may be used. Preferred noble metal precursors include platinum tetrammine hydroxide hexachloroplatinic acid and $Pt(OH_2)_4Cl_2$.

As described hereinabove, the noble metal is to be added to the delta manganese phase formed on or in the inert support. The addition step is carried out in such a manner that the final catalyst composition contains no more than about 20,000 ppm of the noble metal, based upon the weight of the catalyst without considering the weight of the carrier. Typically, the noble metal or mixture of noble metals is added to the delta manganese composition in amounts ranging from about 10 to about 20,000 ppm, more preferably from 500 to about 2,000 ppm, e.g., 1000 ppm. Adding noble metals to the delta manganese in amounts greater than about 20,000 ppm disproportionately increases the cost of the catalyst relative to the increases in combustion activity that are achieved, making such additions commercially uneconomical and, therefore, undesirable.

The oxidation catalysts of the present invention may be used to oxidize VOCs, such as hydrocarbons and oxygen-containing hydrocarbons to carbon dioxide and water at low temperatures, for example, below 600° F. Preferably, the catalyst may be used to oxidize oxygen-containing VOCs such as alcohols, acetates, esters, ethers, aldehydes, ketones, carboxylic acids and the like, in waste gases in the presence of a catalyst contaminant, e.g., sulfur. The catalysts are useful to oxidize oxygenated VOC emissions in such operations as bakeries, breweries, flexographic printing processes and the like, thereby reducing the levels of oxygenated VOCs in the waste gas. In such a preferred embodiment, the waste gas is contacted with a catalyst of the invention for a sufficient time at a sufficient temperature to oxidize oxygen-containing VOCs in the waste gas, most preferably to carbon dioxide and water.

The following examples of the invention are merely illustrative and should not be construed as limiting. One skilled in the art can make, without undue experimentation, various substitutions and variations and by equivalent means, performing in substantially the same manner, obtain substantially the same results without departing from the teaching and spirit of the invention.

EXAMPLE 1

Preparation of $Pt/(Na)MnO_2 \cdot H_2O$ Supported on $Al_2O_3$

Alumina beads (⅛") were dried at 650° C. for a period of four hours in order to remove $H_2O$. The measured $H_2O$ pore volume of the dried beads was 1.1 cc/g. The dried beads were impregnated (using a spray technique) to 100% incipient wetness using a 0.8M solution of $Mn(NO_3)_2$. The dried beads were then dried for 6 hours at 75° C. in a muffle furnace. The dried beads were then impregnated to 100% incipient wetness with a 2M solution of NaOH. Immediately upon NaOH solution exposure the beads changed color from off-white to dark brown. The beads were allowed to "age" 2 hours in the open air at room temperature. The beads were then dried overnight at 120° C. in a muffle furnace. The measured $H_2O$ pore volume at this point was 0.9 cc/g. The beads were then impregnated with a 0.007M solution of $Pt(NH_3)_4(OH)_2$ to a level of 85% incipient wetness. The final active state of the catalyst was achieved by heating the beads for 2 hours at 300° C. in a muffle furnace.

EXAMPLE 2

Preparation of $Pt/(Na)MnO_2 \cdot H_2O$ Supported on $Al_2O_3$

A two step synthetic procedure used to prepare a catalyst in accordance with the present invention is described.

994 g of γ-alumina beads were impregnated to 100% incipient wetness with a solution containing 182.1 g of $Mn(CH_3COO)_2 \cdot 4H_2O$ dissolved in 1 liter of deionized water. The impregnated beads were dried for 15 hours at 120° C. A solution was made up by dissolving 80 g of NaOH pellets in one liter of DI water. The solution was used to dilute 26.9 g of tetramine platinous hydroxide solution, at a concentration of 3.7 wt % as Pt, to a total weight of 660 g. The dried beads were impregnated with this solution. The beads turned brown immediately and darkened when left to dry in air for 4 hours. The beads were dried for 18 hours at 120° C. and calcined at 300° C. for 3.5 hours.

EXAMPLE 3

Preparation of $Pt/(Na)MnO_2 \cdot H_2O$ Supported on $Al_2O_3$

A one step synthetic procedure used to prepare a catalyst in accordance with the present invention is described.

900 g of γ-alumina beads were impregnated to 50% incipient wetness with a solution containing 191 g of $Mn(CH_3COO)_2 \cdot 4H_2O$ in DI water. The beads were immediately impregnated to 100% incipient wetness with a solution containing 24.3 g of tetramine platinum hydroxide (at 3.7 wt % as Pt) and 71.3 g of NaOH in DI water. The beads turned brown immediately and turned dark brown gradually. The resultant beads were dried at 120° C. for 1 hour and calcined at 300° C. for one hour.

EXAMPLE 4

The VOC combustion activity of supported Pt/(Na) $MnO_2 \cdot H_2O$, prepared according to the synthetic procedure described in Example 1, is compared to the activity of a commercially available alumina supported Pt/Pd combustion catalyst.

Both catalysts were tested for ethanol combustion at the following conditions: 850 ppm $CH_3CH_2OH$, 15% $O_2$, 17% $H_2O$, 5% $CO_2$, 10 ppm $SO_2$, 500° F., and a space velocity of 30,000 $hr^{-1}$. 10 ppm of $SO_2$ was used to simulate prolonged poison exposure in the field.

FIG. 1 shows the ethanol conversion versus time for the two catalysts at a space velocity of 30,000 $hr^{-1}$. Clearly, the invention catalyst had superior activity throughout the accelerated aging protocol test.

EXAMPLE 5

The VOC combustion activity of supported Pt/(Na) $MnO_2 \cdot H_2O$, prepared according to the synthetic procedure described in Example 1, is compared to the activity of two other supported Mn containing combustion catalysts. All catalysts were supported on $Al_2O_3$.

All catalysts were tested for ethanol combustion at the following conditions: 850 ppm $CH_3CH_2OH$, 15% $O_2$, 17% $H_2O$, 5% $CO_2$, 10 ppm $SO_2$, 500° F., and a space velocity of 30,000 $hr^{-1}$. 10 ppm of $SO_2$ was used to simulate prolonged poison exposure in the field.

Figure 2:
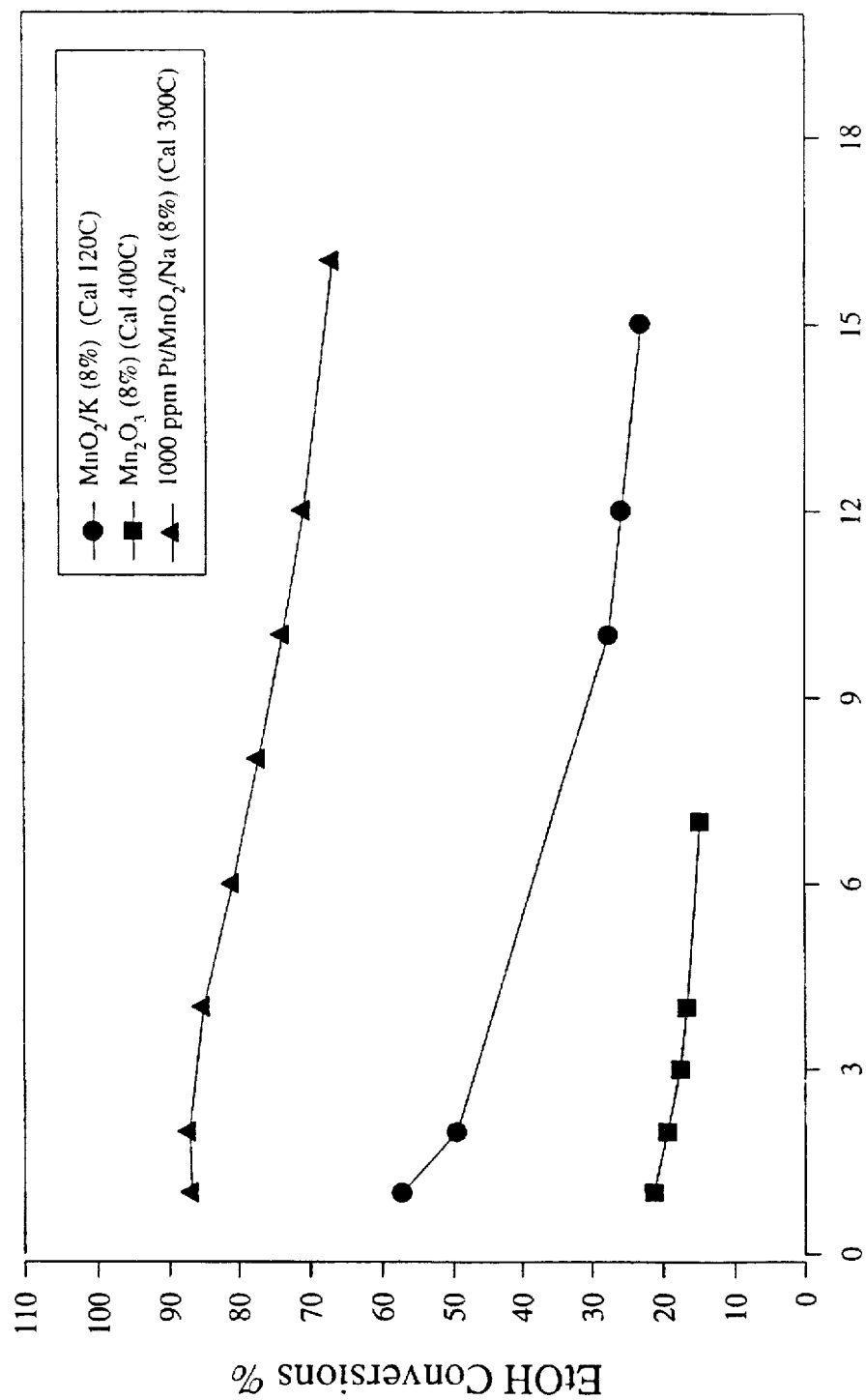
FIG. 2 compares the conversion of ethanol in the presence of $SO_2$ versus hours of aging for $Pt/(Na)MnO_2.H_2O$ supported on $Al_2O_3$ with other supported manganese containing combustion catalysts.
Figure 3:
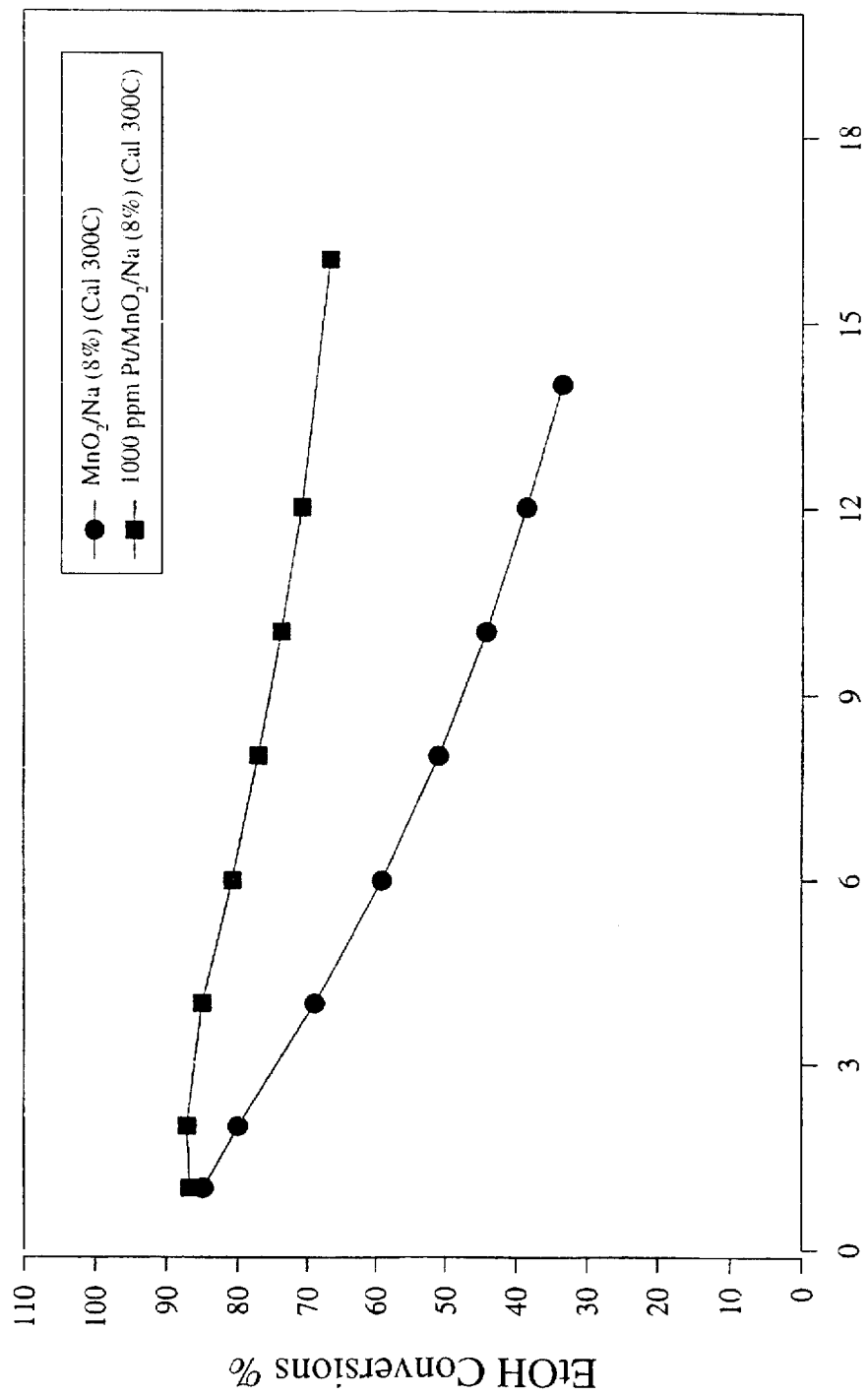
FIG. 3 compares the conversion of ethanol in the presence of $SO_2$ versus aging for $Pt(Na)MnO_2.H_2O$ supported on $Al_2O_3$ with $(Na)MnO_2.H_2O$ supported on $Al_2O_3$.

FIG. 2 shows the ethanol conversion activity versus the aging time for the three Mn containing catalyst at a space velocity of 30,000 $hr^{-1}$.

Clearly, the invention catalyst has superior activity to reduce ethanol in the presence of sulfur throughout the accelerated aging protocol. Supported $Mn_2O_3$, a commonly used combustion catalyst, exhibits relativity little activity towards ethanol combustion.

EXAMPLE 6

The VOC combustion activity of supported Pt/(Na) $MnO_2 \cdot H_2O$, prepared as described in Example 1, is compared to the activity of a supported $(Na)MnO_2 \cdot H_2O$ catalyst. Both catalysts were supported on $Al_2O_3$.

The catalysts were tested for ethanol combustion at the following conditions: 850 ppm ethanol, 15% 17% $H_2O$, 5% $CO_2$, 10 ppm $SO_2$, 500° F., and a space velocity of 30,000 $hr^{-1}$. 10 ppm of $SO_2$ was used to simulate prolonged poison exposure in the field.

Clearly, the invention catalyst exhibited superior lifetime in the presence of sulfur when compared to the supported $(Na)MnO_2$ $H_2O$ catalyst having no noble metal catalyst.

Although preferred embodiments of the invention are described herein in detail, it will be understood by those skilled in the art that variations may be made thereto without departing from the spirit of the invention or the scope of the appended claims.

What is claimed:

1. A catalyst for oxidizing volatile organic compounds (VOCs), in particular, oxygen containing VOCs, to carbon dioxide and water comprising an inert support having deposited on the surface thereof a delta manganese dioxide hydrate, and a catalytically effective amount of at least one noble metal, wherein the delta manganese dioxide hydrate has the formula $A_xMnO_2 \cdot yH_2O$ where x is 0.1 to 2, y is 0.1 to 5, A is alkali metal cation or $NR_4^+$, and R is H or an alkyl group having 1 to 6 carbon atoms, and wherein said catalyst resists poisoning by sulfur containing catalytic poisoning species.

2. A catalyst according to claim 1 wherein the inert support is selected from a metal, glass or metal oxide.

3. The catalyst according to claim 2 wherein the support is a metal oxide.

4. A catalyst according to claim 3 wherein the metal oxide support is a porous refractory metal oxide selected from the group consisting of aluminum oxide, silica, magnesium aluminate, titanium oxide, zirconium oxide, and a mixture thereof.

5. The catalyst according to claim 1 wherein the support is in the form of beads, powders, slurries, gels, monoliths, washcoats, fibers, sheets, honeycomb or extrudates.

6. The catalyst of claim 1 wherein the noble metal is platinum, palladium, silver, gold, rhodium, iridium, ruthenium or osmium.

7. The catalyst of claim 5 wherein the support is in the form of beads.

8. The catalyst of claim 6 wherein the noble metal is platinum or palladium.

9. The catalyst of claim 1 wherein A is an alkali metal cation.

10. The catalyst of claim 9 wherein the alkali metal cation is selected from the group consisting of sodium, lithium, potassium, rubidium and cesium.

11. The catalyst of claim 10 wherein the alkali metal cation is sodium.

12. The catalyst of claim 1 wherein A is $NR_4^+$ and R is H.

13. A method for reducing volatile organic compounds (VOCs) in a waste gas in the presence of sulfur containing compounds comprising contacting a waste gas comprising sulfur and at least one VOC with a catalyst comprising an inert support having deposited on the surface thereof a delta manganese dioxide hydrate having the formula $A_xMnO_2 \cdot yH_2O$ where x is 0.1 to 2, y is 0.1 to 5, A is alkali metal cation or $NR_4^+$ and R is H or an alkyl group having 1 to 6 carbon atoms, and a catalytically effective amount of a noble metal.

14. The method according to claim 13 wherein the VOC is an oxygen-containing VOC.

15. The method according to claim 13 wherein the inert support is metal, glass or metal oxide.

16. The method according to claim 15 wherein the inert support is a metal oxide selected from the group consisting of aluminum oxide, silica, magnesium aluminate, titanium oxide, zirconium oxide and a mixture thereof.

17. The method according to claim 16, wherein the metal oxide is aluminum oxide.

18. The method according to claim 13, wherein the inert support is in the form of beads, powders, slurries, gels, monoliths, washcoats, fiber, sheets, honeycombs or extrudates.

19. The method according to claim 18, wherein the inert support is in the form of beads or extrudates.

20. The method according to claim 13, wherein said noble metal is platinum, palladium, silver, gold, rhodium, iridium, ruthenium, or osmium.

21. The method according to claim 20 wherein said noble metal is platinum or palladium.

22. The method according to claim 13, wherein the waste gas is produced by a process selected from the group consisting of fermentation, brewing, bakeries and flexographic printing.

23. The method according to claim 14, wherein the oxygen containing VOC is selected from the group consisting of alcohols, esters, ethers, aldehydes, ketones, carboxylic acids and acetates.

24. The method according to claim 13, wherein A is an alkali metal cation selected from the group consisting of sodium, lithium, iubidium, potassium and cesium.

25. The method according to claim 13 wherein A is $NR_4^+$ and R is H.

26. The method according to claim 24, wherein the alkali metal cation is sodium.

27. A method for preparing an oxidation catalyst for oxidizing volatile organic compounds (VOCs), in particular oxygen containing VOCs in waste gas comprising (1) forming an inert support; (2) treating the inert support to impregnate and/or deposit in or on the surface of the metal oxide support a delta manganese dioxide hydrate and a catalytically active amount of a noble metal, wherein the delta manganese dioxide hydrate has the formula

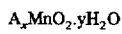

$A_xMnO_2 \cdot yH_2O$ where x is 0.1 to 2, y is 0.1 to 5, A is alkali metal cation or $NR_4^+$ and R is H or an alkyl group having 1 to 6 carbon atoms.

28. The method of claim 27 wherein the inert support is treated by (1) contacting the support with an aqueous solution of manganese salt; (2) optionally, drying the support at a time and temperature sufficient to remove excess water; (3) contacting the support with an aqueous solution of an A containing hydroxide; (4) drying the support in an oxygen containing atmosphere for a time and at a temperature sufficient to impregnate and/or deposit the metal delta manganese dioxide hydrate on or in the surface of the support; (5) contacting the delta manganese support with an aqueous solution of a noble metal-containing salt; (6) drying and optionally, calcining the support.

29. The method of claim 27 wherein the inert support is treated by (1) contacting the support with a first aqueous solution of manganese salt; (2) optionally, drying the support at a time and temperature sufficient to remove excess water; (3) thereafter, impregnating the inert support with a second aqueous solution containing an A containing hydroxide and a noble metal containing salt; (4) drying the impregnated support in an oxygen containing atmosphere for a time and at a temperature sufficient to impregnate and/or deposit the delta manganese dioxide hydrate on or in the surface of the support; and (5) drying and, optionally, calcining the support.

30. The method of claim 27 wherein the inert support is treated by (1) contacting the support with an aqueous solution of manganese salt, an A containing hydroxide, and a noble metal containing salt; (2) drying the impregnated support in an oxygen containing atmosphere for a time and at a temperature sufficient to impregnate and/or deposit the delta manganese dioxide hydrate on or in the surface of the support; and (3) drying and, optionally, calcining the support.

* * * * *